(12) United States Patent
Steiner

(10) Patent No.: US 6,799,854 B1
(45) Date of Patent: Oct. 5, 2004

(54) BINOCULARS, TELESCOPE OR THE LIKE WITH PROTECTIVE LENS CAP ARTICULATED TO THE FRONT OF THE LENS

(75) Inventor: Carl Steiner, Bindlach (DE)

(73) Assignee: Steiner-Optik GmbH, Bayreuth (DE)

( * ) Notice: Subject to any disclaimer, the term of this patent is extended or adjusted under 35 U.S.C. 154(b) by 0 days.

(21) Appl. No.: 10/465,629

(22) Filed: Jun. 20, 2003

(51) Int. Cl.[7] .............................................. G02B 23/16
(52) U.S. Cl. ..................... 359/611; 359/511; 359/612
(58) Field of Search ................................ 359/399–412, 359/511, 600–612, 808–819; 42/101–129; 396/448

(56) References Cited

U.S. PATENT DOCUMENTS

| | | | | |
|---|---|---|---|---|
| 2,488,188 A | * | 11/1949 | Halvorson | 42/129 |
| 2,849,795 A | * | 9/1958 | Vissing | 42/129 |
| 3,840,883 A | | 10/1974 | Choate | |
| 4,641,932 A | | 2/1987 | Harms | |
| 4,909,617 A | | 3/1990 | Boyd | |
| 5,495,676 A | * | 3/1996 | Chesnut et al. | 42/129 |
| 5,631,772 A | | 5/1997 | Mizukawa | |
| 5,815,316 A | | 9/1998 | Friedman et al. | |
| 6,088,174 A | * | 7/2000 | Cox | 359/819 |
| 6,247,855 B1 | * | 6/2001 | Motohashi et al. | 396/448 |
| 6,416,189 B1 | * | 7/2002 | Watson | 359/611 |

OTHER PUBLICATIONS

Patent Abstracts of Japan, Publication No. 01097932, "Controller For Opening And Closing Barrier For Camera," Konica Corp, Apr. 17, 1989.

* cited by examiner

Primary Examiner—Thong Q Nguyen
(74) Attorney, Agent, or Firm—Browdy and Neimark, P.L.L.C.

(57) ABSTRACT

A pair of binoculars, a telescope or the like, comprising a protective lens cap articulated to the front of the lens, is characterized in that a pivot joint arrangement is formed between an edge of the lens and the protective lens cap, in use having a substantially horizontal pivot axis and a substantially vertical pivot axis.

5 Claims, 3 Drawing Sheets

BINOCULARS, TELESCOPE OR THE LIKE WITH PROTECTIVE LENS CAP ARTICULATED TO THE FRONT OF THE LENS

BACKGROUND OF THE INVENTION

1. Field of the Invention

The invention relates to a pair of binoculars, a telescope of the like, comprising a protective lens cap articulated to a front of the lens.

2. Background Art

Conventional protective lens caps of the generic type are usually designed in such a way that they are not at all secured to the casing and, upon removal of the caps, they easily get lost and must be kept carefully, or they are articulated to the edge of the lens by a so-called integral hinge. This hinge precludes the protective caps from getting lost; however, they will flap in the wind and whenever the binoculars are moved, directly interfering with any observation or indirectly interfering by reflections.

SUMMARY OF THE INVENTION

It is an object of the invention to provide an optical instrument of the type mentioned at the outset with protective lens caps in such a way that these protective lens caps cannot get lost during observation and will definitely not impair, or interfere with, observation.

According to the invention, this object is attained in that a pivot joint is formed between the edge of the lens and the protective lens cap, in use having a substantially horizontal pivot axis and a substantially vertical pivot axis.

The design according to the invention enables the protective lens cap to be swung upwards in a manner known per se about a substantially horizontal pivot axis, and then, by rotation about the substantially vertical pivot axis in particular by 180°, to be swivelled with the inside turned towards a user's face, and then to be folded down on the top or bottom of the optical instrument where it is reliably secured and does not interfere with observation.

In keeping with a first embodiment according to the invention, it is provided that the pivot joint arrangement, in the vicinity of the edge of the lens, comprises a substantially horizontal pivot joint and, further outwards, a substantially vertical pivot joint i.e., two successive, separate pivot joints.

In keeping with an alternative embodiment, provision is made for the pivot joint arrangement to be a ball-and-socket joint so that the horizontal and the vertical pivot axes combine and are comprised in a single joint arrangement, which ensures highly economic manufacture and advantageous final assembly by reason of the snap-in locking that is feasible in such a ball-and-socket joint.

By advantage, the pivot joint arrangement may further be embodied for defined internal friction or locking such that the protective lens cap can be positioned in a stable stop position i.e., no special locking mechanisms are needed on the top surface of the casing, keeping the protective caps in the stop position folded down on the top surface.

By advantage, the protective lens caps, when removed from the lens and swung out, serve as a support for the optical instrument when it is put down, this offering another possibility of use of the caps which reliably preclude any damages to the instrument when it is put down and make it easier to lift the instrument by producing a distance from where it is put down.

Details of the invention will become apparent from the ensuing description of a preferred embodiment, taken in conjunction with the drawing.

DESCRIPTION OF THE PREFERRED EMBODIMENT

Figure 1:
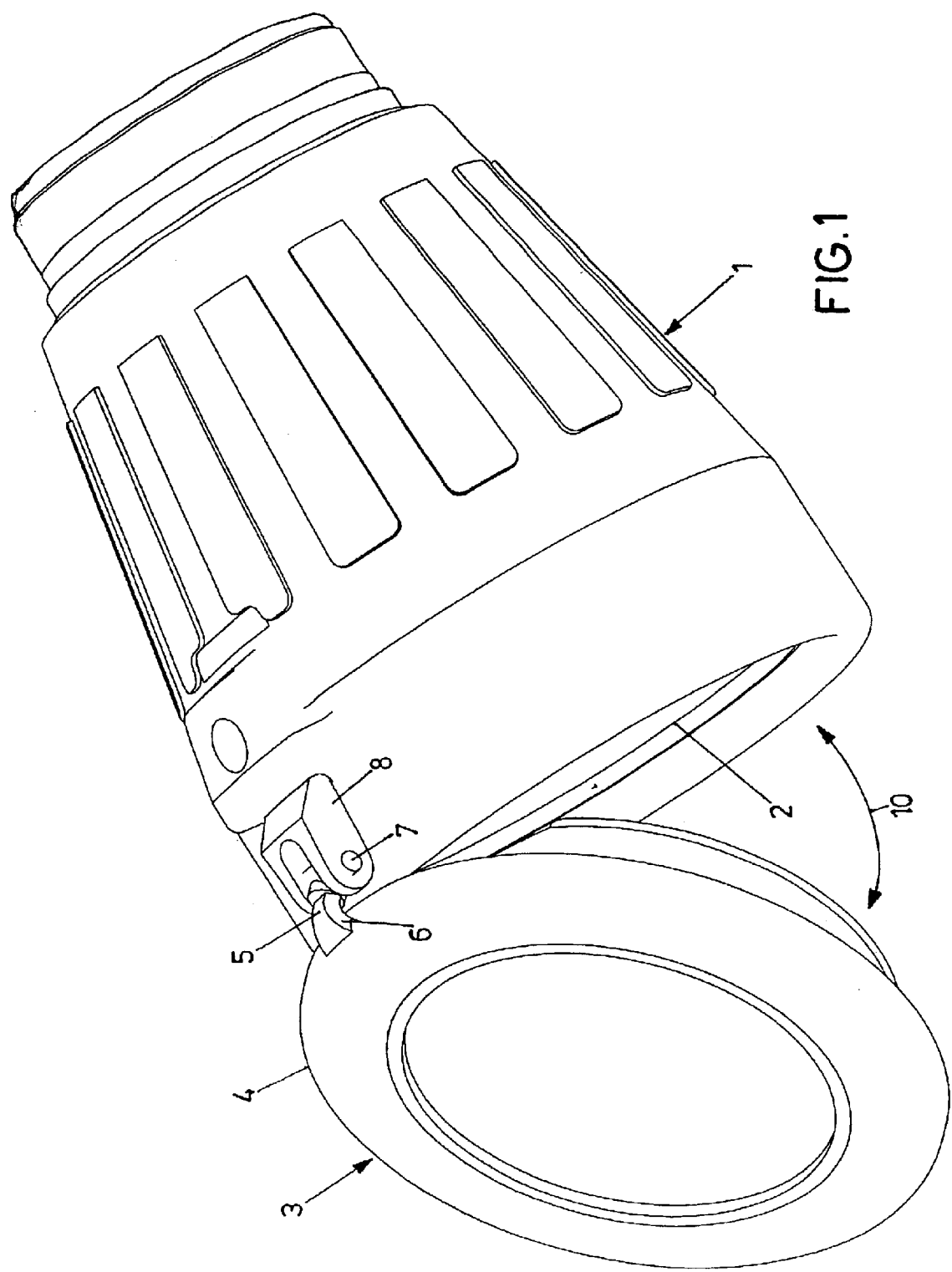
FIG. 1 is a perspective view of the area of a lens of a pair of binoculars.

The drawing illustrates the area of a lens of a pair of binoculars 1, the lens 2 being covered by a pivotable protective lens cap 3.

Figure 3:
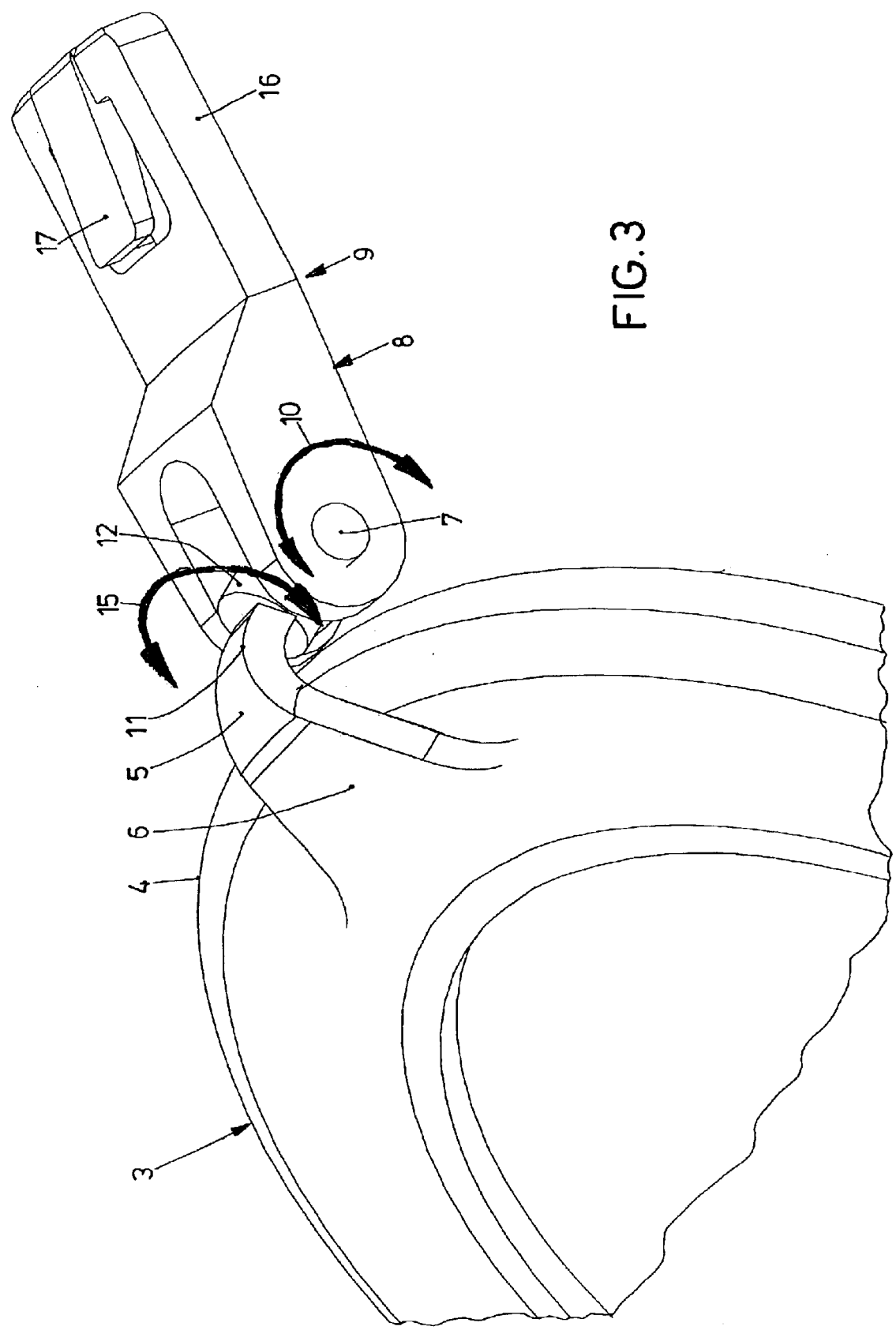
FIG. 3 is a perspective view, on an enlarged scale, of the pivot joint of the protective lens cap.

The protective lens cap 3 comprises an attachment 6, which enclasps the outer edge 4 of the cap 3 by means of a crimp 5 and has a pivot bearing bolt 7 molded on integrally, the bolt 7 running crosswise of the crimp 5 and engaging with the forked end 8 of a joining piece 9; in this way a pivot bearing is formed, the bearing axis of which corresponds to the central longitudinal axis of the bearing bolt 7 i.e., a pivot bearing with a substantially horizontal pivot axis in the condition of use, ensuring a pivoted motion in the direction of the arrow 10 of FIG. 3.

The end 11 of the crimp 5 includes a widened cylindrical fitting 12 which is topped by a pivot bearing bolt 13 of reduced diameter which engages with a drilled hole 14 of the pivot bearing bolt 7 (see FIG. 2), in this way forming a pivot bearing around a substantially vertical pivot axis which enables the protective lens cap 3 to swivel in the direction of the arrow 15 of FIG. 3.

Figure 2:
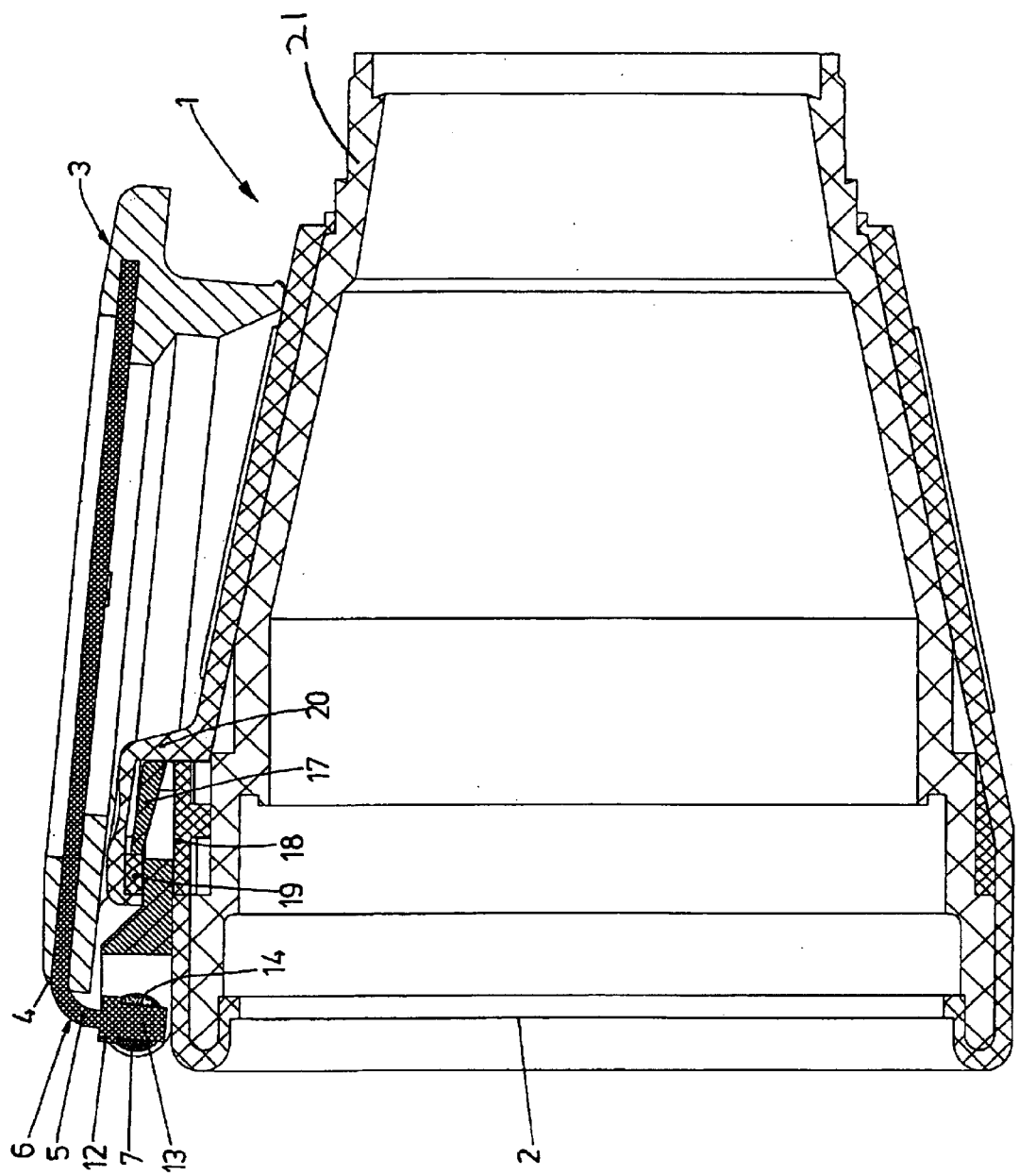
FIG. 2 is a longitudinal section of the area of the lens.

The free end of the joining piece 9 comprises a locking piece 16 with a snap-in pin 17, the locking piece 16 snap-engaging with a locking ring 18 for securing the protective lens cap 3 on the casing (21) in the vicinity of the lens 2 of the binoculars 1, as seen in FIG. 2. The snap-in pin 17 touches the top surface 19 of the locking ring 18 from behind. This locking engagement may be released when the rubber coating 20 is pressed.

The design according to the invention enables the protective lens cap 3 to be releasably secured to the binoculars 1 in the vicinity of the lens 2. When secured, the protective lens cap can be swung upwards from the closed condition about the substantially horizontal pivot axis in the direction of the arrow 10 and, when approximately parallel to the lens 2, it can be pivoted by 180° about the substantially vertical axis in the direction of the arrow 15 so that the inside of the protective lens cap, originally facing the lens 2, is turned towards a user's face, and the protective lens cap 3 may then again be pivoted about the substantially horizontal pivot axis in the direction of the arrow 10, as seen in FIG. 2, and folded down on the top surface of the binoculars 1 in the vicinity of the lens 2.

In this way, it is ensured that the protective lens cap does not interfere in any way with observation. Moreover, the binoculars can be put down with the protective lens cap downwards, ensuring gentle handling and easy lifting of the binoculars.

What is claimed is:

1. A pair of binoculars (1) or a telescope, comprising a protective lens cap (3) articulated in front of each lens (2) fixed in a casing (21) of the binoculars or telescope, wherein a pivot joint arrangement is formed between an edge (4) of the protective lens (2) cap and the casing of the binoculars or telescope, the protective lens cap (3) having a substantially horizontal pivot axis and a substantially vertical pivot axis.

2. The pair of binoculars (1) or the telescope according to claim 1, wherein the pivot joint arrangement comprises a substantially horizontal pivot joint and a substantially vertical pivot joint.

3. The pair of binoculars (1) according to claim 1, wherein the pivot joint arrangement possesses internal friction for the protective lens cap (3) to be positioned in a stable stop position.

4. The pair of binoculars (1) or telescope according to claim 1, wherein the protective lens cap (4), in a swung out, pivoted condition, works as a support for the binoculars or telescope.

5. The pair of binoculars (1) or telescope according to claim 1, wherein each protective lens cap (4) is releasably fixable to the casing (21) of the binoculars (1) or telescope.

* * * * *